Feb. 17, 1942.  F. K. FISCHER  2,273,186
CLOSURE FOR HIGH PRESSURE HEADS
Filed April 21, 1938
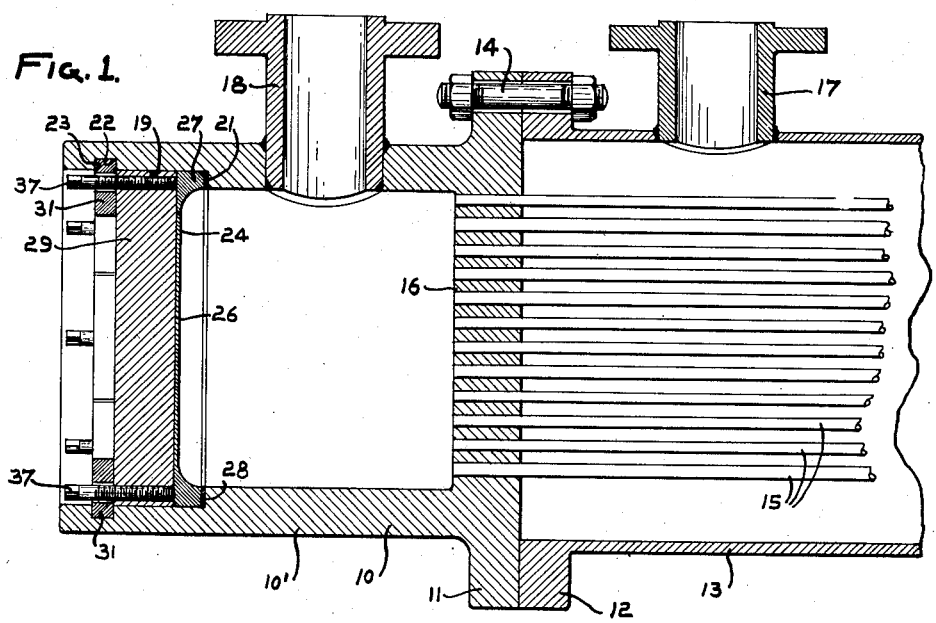
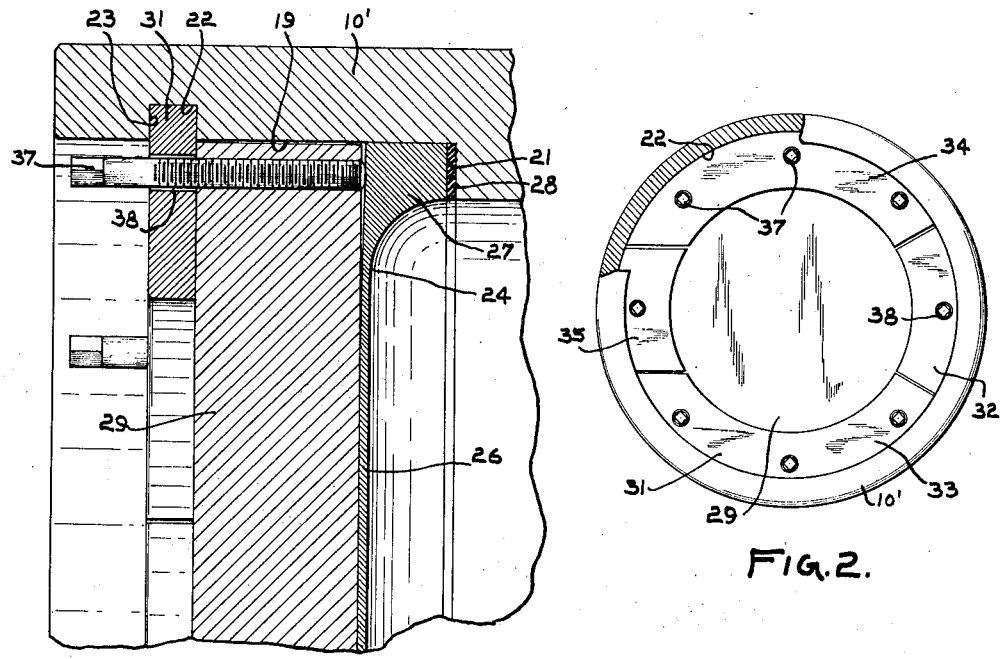
INVENTOR
FREDERICK K. FISCHER Patented Feb. 17, 1942

2,273,186

UNITED STATES PATENT OFFICE 2,273,186

CLOSURE FOR HIGH PRESSURE HEADS

Frederick K. Fischer, Prospect Park, Pa., assignor to Westinghouse Electric & Manufacturing Company, East Pittsburgh, Pa., a corporation of Pennsylvania Application April 21, 1938, Serial No. 203,290

2 Claims. (Cl. 220—3)

My invention relates to closures for pressure vessels and more particularly to covers or closure members for high-pressure heads of heat exchange apparatus.

An object of my invention is the provision of a closure for high-pressure heads wherein both the internal pressure load and the sealing load are transmitted to a shear ring.

A further object of my invention is the provision of a closure for high-pressure heads wherein the sealing load is transmitted to the shear ring by bolts under compression.

Another object of my invention is the provision of a closure for a high-pressure head having sealing engagement with said head and an arrangement of bolts under compression for applying sealing pressure, the heads of the bolts being accessible at all times for adjustment of the sealing pressure.

These and other objects are effected by my invention as will be apparent from the following description and claims taken in accordance with the accompanying drawing, forming a part of this application, in which:

Fig. 1 is a longitudinal sectional view of a portion of a tubular heat exchanger constructed in accordance with the invention;

Fig. 2 is an end elevational view of the structure shown in Fig. 1 with a portion broken away for the sake of clearness; and, Fig. 3 is an enlarged sectional view of a portion of the structure of Fig. 1.

In the drawing there is shown a high-pressure head 10 in the form of a cylindrical body provided at one end with a flange 11 by which it is secured to a flange 12 of a tubular heat exchanger shell 13, by suitable means, such as bolts 14. Tubes 15 have terminal portions secured in the tube plate wall 16 of the high pressure head 10, and they extend longitudinally through the shell to the outlet end (not shown) of the heat exchanger. As is usual, the shell 13 has an inlet 17, and when the heat exchanger is of the single-pass type, as herein illustrated, the head 10 is provided with an inlet 18 for the admission of fluid under high pressure. The head 10 is closed at its outer end by a cover 29 and holding means 31.

The high-pressure head 10 includes a cylindrical wall 10' whose outer end is counterbored at 19 to receive the cover 29 and to provide a radially extending sealing shoulder or surface 21 inwardly of the cover. Outwardly of the cover, the counterbored portion of the wall has an inwardly opening circumferential groove 22 providing a radially extending thrust shoulder 23 facing toward the sealing surface 21.

A sealing diaphragm 24 has a relatively thin and flexible center portion 26, normally bearing against the inner face of the cover and a rigid annular rim portion 27 contacting the sealing surface 21 of the head 10. Preferably a gasket 28 is interposed between the rim 27 and the sealing surface 21. When conditions are suitable, the gasket 28 may be omitted and direct contact of the rim 27 and sealing surface 21 relied upon for sealing.

A shear ring 31 closely fits in the groove 22 and abuts the thrust shoulder 23 thereof. To facilitate assembly of this shear ring 31 in the groove 22, the former is divided into a plurality of segments or shear pieces, for example, 32, 33, 34 and 35. As shown in Fig. 2, shear piece 32 is a segment of the annular shear ring with radially extending edges. The shear pieces 33 and 34 have one radially extending edge and the other edge is so shaped that the remaining shear piece 35 may have parallel edges. Shear piece 35 is inserted last, and its parallel edges permit its ready insertion into the groove 22.

The bolts 37 are threadedly mounted in the cover 29 near the outer edge of the latter and extend entirely therethrough so that their inner ends contact the outer surface of the rim 27 of the flexible sealing diaphragm and transmit sealing pressure therethrough to the cover 29, the pressure applied to the cover 29 being transmitted to the shear ring 31, and thence to the thrust shoulder 23.

The shear ring 31 is provided with openings 38 aligned with the bolts 37, and through which said bolts freely extend with the heads thereof positioned externally of the shear ring 31 and cover 29. By this construction, adjustment of the sealing pressure at the sealing surface 21 may be effected at all times, even when the head 10 is under high pressure. Furthermore, the shear pieces are retained within the groove 22 by the passage of the bolts 37 through the openings 38 in said shear pieces. Substantially all of the pressure within the head 10 is transmitted through the flexible portion 26 of the diaphragm 24 by direct contact of the latter with the cover 29, and thence to the shear ring 31 and thrust shoulder 23. Thus, practically the only pressure upon the bolts 37 is that required for sealing, and this is a compressive force rather than one of tension as has heretofore been the case in such constructions.

A further advantage of the arrangement lies in the elimination of bolts extending through the diaphragm rim to the head 10 for applying sealing pressure, and the consequent permissible narrowing of the sealing shoulder or surface 21. The use of a narrower sealing surface permits of a corresponding reduction in the thickness of the wall of the head 10.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. Apparatus of the character described comprising a hollow, pressure-sustaining body member having a thrust shoulder and a sealing surface; a diaphragm member having a relatively thin, flexible central portion and a relatively thick, rigid rim portion; said rim portion being adjacent the sealing surface; a plurality of shear pieces adjacent the thrust shoulder; a cover positioned between and in contact with the diaphragm member and the shear pieces for transmitting pressure from the former to the latter; and means threadedly mounted in said cover for urging the rim portion of the diaphragm member into sealing engagement with the sealing surface, whereby the sealing pressure will be transmitted through the cover to the shear pieces.

2. Apparatus of the character described comprising a hollow, pressure-sustaining body member having a thrust shoulder and a sealing surface; a cover intermediate said thrust shoulder and said sealing surface; a diaphragm comprised by a rigid rim portion positioned between said cover and said sealing surface and a flexible central portion contacting said cover and transmitting pressure thereto from within the body member; a plurality of shear pieces for transmitting pressure from the cover to the thrust shoulder; and means carried by the cover for urging the rim portion of the diaphragm into sealing relation with the sealing surface; said means comprising bolts carried by the cover and engaging the rim portion under compression and the bolts having heads which are accessible exteriorly of the body member and of the cover for adjustment of the sealing pressure.

FREDERICK K. FISCHER.